United States Patent [19]

Smieskol et al.

[11] Patent Number: 4,738,687

[45] Date of Patent: Apr. 19, 1988

[54] PROCESS FOR THE REMOVAL OF RESIDUE PARTICLES FROM A PRESSURIZED GASIFICATION REACTOR

[75] Inventors: Stefan Smieskol, Essen; Johann Harjung, Dorsten; Joachim Meckel, Ratingen, all of Fed. Rep. of Germany

[73] Assignee: Veba Oel Entwicklungs-Gesellschaft mbH, Gelsenkirchen, Fed. Rep. of Germany

[21] Appl. No.: 932,479

[22] PCT Filed: Mar. 4, 1986

[86] PCT No.: PCT/DE86/00080

§ 371 Date: Oct. 20, 1986

§ 102(e) Date: Oct. 20, 1986

[87] PCT Pub. No.: WO86/05198

PCT Pub. Date: Sep. 12, 1986

[30] Foreign Application Priority Data

Mar. 5, 1985 [DE] Fed. Rep. of Germany ....... 3507628

[51] Int. Cl.$^4$ ............................................. C10J 3/00
[52] U.S. Cl. .............................. 48/197 R; 48/69; 48/210; 110/171; 414/218
[58] Field of Search ................. 48/197 R, 86 R, 87, 48/69, 210; 414/158, 211, 213, 214, 218, 292, 310; 110/165 R, 171

[56] References Cited

U.S. PATENT DOCUMENTS

| 1,957,583 | 5/1934 | Foresman | 110/165 R |
|---|---|---|---|
| 2,184,248 | 12/1939 | Bonotto | 414/218 |
| 2,685,853 | 8/1954 | Schlick | 110/165 R |
| 2,906,417 | 9/1959 | Presi | 414/218 |
| 2,925,334 | 2/1960 | Henze et al. | 48/86 R |
| 3,341,280 | 9/1967 | Eolkin | 414/218 |
| 3,756,434 | 9/1973 | Teske | 414/218 |
| 3,950,146 | 4/1976 | Funk | 110/165 R |
| 4,255,161 | 3/1981 | Grimminger et al. | 48/86 R |
| 4,463,686 | 8/1984 | Premel | 110/165 R |
| 4,472,171 | 9/1984 | Broderick | 414/214 |

FOREIGN PATENT DOCUMENTS

| A0011151 | 5/1980 | European Pat. Off. . |
| K6670V24 | 6/1953 | Fed. Rep. of Germany . |
| C944812 | 5/1956 | Fed. Rep. of Germany . |
| 10121115 | 12/1957 | Fed. Rep. of Germany . |
| 1031925 | 6/1958 | Fed. Rep. of Germany . |
| A1421659 | 10/1968 | Fed. Rep. of Germany . |
| 2850121 | 9/1981 | Fed. Rep. of Germany . |
| A3320595 | 12/1984 | Fed. Rep. of Germany . |

OTHER PUBLICATIONS

Chemikerzeitung, 1955, p. 176.
Chemieingenieurtechnik, 1981, pp. 335, 339 and 340.

*Primary Examiner*—Peter Kratz
*Attorney, Agent, or Firm*—Oblon, Fisher, Spivak, McClelland & Maier

[57] ABSTRACT

In this process for the removal of residue particles from a discharge opening of a pressurized gasification reactor according to the fluidized bed or flue dust principle the residue particles are removed by a worm conveyor. To avoid pressure fluctuations in the actual gasification process and to perform a continuously operating residue removal not susceptible to disturbances the discharge opening of the worm conveyor housing is provided with an adjustable pressure device for exerting a closing pressure on a closing element.

1 Claim, 1 Drawing Sheet

U.S. Patent  Apr. 19, 1988  4,738,687
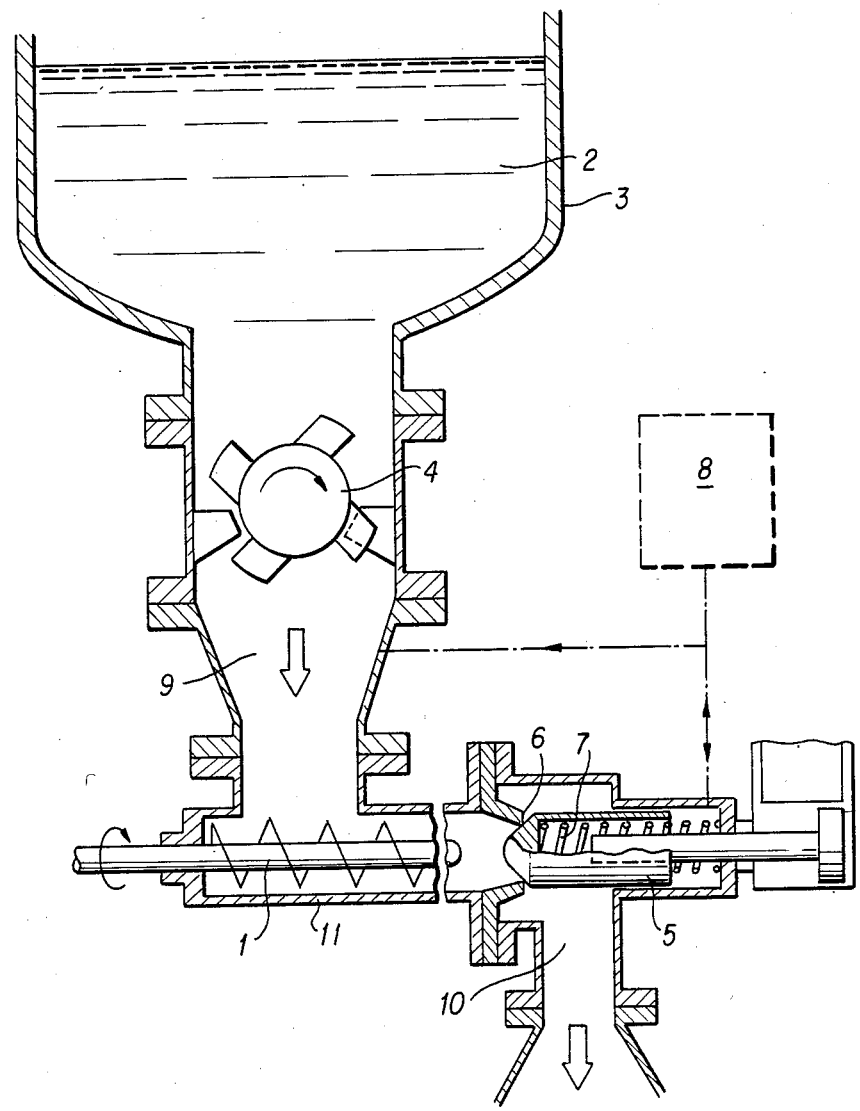

PROCESS FOR THE REMOVAL OF RESIDUE PARTICLES FROM A PRESSURIZED GASIFICATION REACTOR

TECHNICAL FIELD

The invention relates to a process for the continuous or batch removal of residue particles in the form of ash, slag as well as optionally solid carbon particles from a discharge opening of a pressurized gasification reactor according to the fluidized bed or fluidized dust principle by means of at least a worm conveyor rotatable in a housing, whereby the intake connection of the housing is connected to the reactor discharge connection receiving the residue particles and whereby the particles are removed from the worm conveyor through a discharge opening into a removal chamber or the like.

BACKGROUND ART

For the discharge of ash, slag as well as optionally carbon particles (gasification residues), which accumulate in the pressurized gasification of liquid or solid fuels, various removal systems working intermittently on a dry or wet basis are known.

Thus, a removal device for a fluidized-bed reactor preferably operating under pressure has been proposed, which makes possible a metered material discharge by an adjustable drive and whereby the material to be discharged forms the closing element so that no closing bodies such as slides or the like are provided and whereby the conveyor element is designed as a worm conveyor (cf. DE-OS No. 32 41 239).

A similar principle is put into effect in the case of a pressureless gasification reactor with wet ash removal, in which the particles of the gasification residue are collected in the water-filled axial bottom connection of the gasification reactor and in which a worm conveyor provides for removal of the residue particles that have settled beneath the water surface (EP-OS 0 117 765).

In known systems, especially for dry removal of ash as well as slag constituents, which accumulate during pressurized gasification, locks have been used so far, as is generally done if streams of solids are to be conveyed between spaces of different pressure and the escape of possibly harmful gases has to be prevented. Other apparatus, machines and control devices belong to such removal systems. In this case, one or more bunkers are used which as a rule are placed under the gasification reactor and are separated from one another and from the reactor by combinations of fittings.

An ash discharge with two bunkers is so made, for example, that dry or wet ash from the reactor is conveyed under pressure into the first bunker. After the reactor and bunker are separated, the bunker is expanded, the expansion gases are removed. Then the connection to the second bunker is opened, so that the dry ash or residue water suspension gets into the pressureless container below. In the case of dry ash removal it is additionally necessary to pass scavenging gas through the pressureless container to remove the raw gas containing CO and $H_2S$ from the ash or residue bed before discharge. Then the connection between the bunkers is closed, and the bunker placed directly under the reactor is covered with nitrogen, carbon dioxide or product gas. The ash or residue is removed from the pressureless bunker by suitable conveyor devices. Such a removal system works intermittently. In covering the bunker with product, gas pressure fluctuations are caused in the gasification system. The control of the ash or residue discharge is expensive since a multiplicity of closing fittings must be used. Especially in the case of dry ash removal the operation of the closing fittings is very maintenance intensive and subject to malfunctions because of wear and tear, formation of grooves and corrosion of the sealing surfaces.

DISCLOSURE OF INVENTION

The object of the invention is to make possible, in a process of the type initially indicated, a continuously operating ash or residue removal not susceptible to malfunctions with a marked reduction of expenditures for closing fittings and shutoff elements and without significant pressure fluctuations occurring in the actual gasification process.

This object is attained by the fact that the discharge opening of the worm conveyor housing is provided with an adjustable pressure device acting on a closing element to exert a closing pressure, the particles, optionally mixed with water or a binder, are thickened to a mass plug against the closing pressure of the closing element and the mass plug is discharged by a discharge opening leading into the removal chamber.

However a batch removal of the ash or slag residue particles is also possible, if fuels are used with low ash content whose accumulation does not require permanent continuous removal.

Preferred other designs provide that the actuation of the closing element is to be performed either by a hydraulic pressure holding unit independent of the reaction space of the pressurized gasification reactor or by a hydraulic device, which is connected to the pressure prevailing in the reactor, and transmits to the closing element a closing pressure corresponding to the reactor pressure.

By this measure at least as great a pressure is maintained within the conveyor device, consisting of the housing and worm conveyor, as in the gasification reactor.

Another design provides that an additional pressure, relative to the operating pressure of the reactor, is transmitted to the closing element. The additional pressure can be transmitted by an adjustable spring or also by another similarly operating means. Since the worm conveyor conveys against the additional pressure, building up of a mass plug of ash or also slag particles, optionally in combination with water in wet removal or also a binder, is made possible.

The closing element is used in a way known in the art as an actuator of a control circuit in which the pressure prevailing in the reactor or a pressure impressed from the outside, e.g., by a hydraulic pressure unit, represents the command variable.

A suitable design of this process or of a corresponding device suitable for carrying out this process consists in the closing element being designed as a piston, cone or the like and the discharge opening exhibiting a correspondingly worked seat for the piston, cone or the like.

Said process makes it possible substantially to reduce and simplify the removal system, whereby there is particularly a saving in fittings and seals. Moreover, a lower maintenance expenditure and a lower susceptibility to malfunctions result.

BRIEF DESCRIPTION OF THE DRAWING

A suitable device for carrying out the proposed process is further explained below by the description of the FIGURE for the case of a wet removal.

The ash and slag particles collecting in water seal 2 of pressurized gasifier 3 arrive in fore bunker or discharge hopper 9. The preliminary crushing taking place by crusher 4, which is placed in the outlet of water seal 2 ahead of discharge hopper 9, prevents larger slag strings from reaching the intake connection of housing 11 in the area of the feeding zone of worm or screw conveyor 1 and blocking it.

Worm conveyor 1 with a predetermined inclination is rotatably placed in a housing 11 beneath pressurized gasifier (gasification reactor) 3. The ash and slag particles arrive from discharge hopper 9 into housing 11.

Removal worm conveyor 1 ends a distance upstream of removal opening 6 of worm conveyor housing 11. When worm conveyor 1 is actuated, a mass plug is formed in the free space of housing 11 upstream of discharge opening 6 against the additional pressure exerted on piston 5 by spring 7, a plug that serves as an additional sealing element between water seal 2 that is under the pressure of the gasification reactor and the ash or slag particles collected therein or the residue dampened with a liquid binder and the space outside discharge passage or connection 10.

Discharge opening 6 of worm conveyor housing 11 ends in the seat for piston 5. Piston 5 is hydraulically pressed onto the sealing surface worked onto the seat, whereby the closing pressure of piston 5 corresponds approximately to the operating pressure of pressurized gasifier 3.

BEST MODE FOR CARRYING OUT THE INVENTION

With a small ash or also slag accumulation, the worm conveyor drive is turned on or off by means of measurement and adjustment of the filling level, to prevent a complete emptying of the discharge hopper 9 and worm conveyor housing 11. It is important that a sufficiently large inflow cross section be present over the intake connection of housing 11, as a result of which particularly malfunctions of the slag granulate inflow into the feed zone of worm conveyor 1 are prevented.

The inclination of worm conveyor 1 is so dimensioned that upon the formation of a pile-up, as explained above, pressure is reduced. The space between the worm conveyor end and discharge opening 6 of worm conveyor housing 11, filled with water-containing residue, acts as a safety zone to prevent a stronger drainage of liquid from water seal 2.

An additional pressure is transmitted by adjustable spring 7 to piston 5 so that during operation of worm conveyor 1 ash or residue components are produced against the largely constant additional pressure transmitted by the spring, independent of operating pressure fluctuations.

A good seat with sufficient sealing is attained, for example, by a pressure-transmitting connection of a suitable regulating slide for the closing element, in the present example for a piston 5, to water seal 2 in gasification reactor 3 or the hydraulic pressure holding unit 8. In this way it is assured that at least the respective operating pressure of gasification reactor 3 is always applied to the adjusting slide and that the discharge device during fluctuating operating pressure is also kept closed by means of the closing element.

The drive element for worm conveyor 1, considering the mechanical properties of the ash and residue components to be removed, is so dimensioned that the additional pressure transmitted to the closing element, e.g., by spring 7 is reliably overcome and with the operation of worm conveyor 1 under pressure of the mass plug formed from ash or residue components the closing element frees the discharge opening 6.

The ash or residue components arrive into a pressureless intermediate bunker placed, for example, beneath discharge connection 10. In case of use of a water seal, the water simultaneously transported by the worm conveyor and also going through the discharge opening produces a fluidizing of the expelled mass plug. Degassing of the residue components can be performed in the intermediate bunker.

INDUSTRIAL APPLICABILITY

With said process makes possible continuous removal of residue components optionally even containing solid carbon from gasification of solid or liquid fuels such as coal, petroleum coke, low temperature carbonization coke, hydrogenation residues, vacuum residues and the like for the production of synthesis gas and its further processing products.

We claim:

1. A process for continuous or intermittent discharge of residue particles of ash or slag from a drain opening of a pressure gasification reactor by means of at least a screw conveyor rotatable in a housing, wherein an intake portion of the housing is connected to a discharge hopper of the reactor receiving the residue particles and the particles are removed from the screw conveyor through a discharge opening into a discharge chamber having a piston biased so as to close said discharge opening, which comprises:

exerting a closing hydraulic pressure corresponding to the reactor pressure on the piston;

transmitting via an adjustable spring an additional pressure in relation to the operating pressure of the reactor to the piston; and operating the screw conveyor so as to compress the residue particles mixed with a liquid into a mass plug against the closing pressure of the piston and to expel the mass plug through a discharge opening leading into the discharge chamber.

* * * * *